Patented Mar. 2, 1948

2,436,840

UNITED STATES PATENT OFFICE 2,436,840

TEMPERATURE STABLE DIELECTRIC AND METHOD OF MAKING SAME

Eugene Wainer, Niagara Falls, N. Y., assignor to The Titanium Alloy Manufacturing Company, New York, N. Y., a corporation of Maine No Drawing. Application May 16, 1946, Serial No. 670,303

4 Claims. (Cl. 106—39)

The present invention relates to new compositions of matter useful as dielectric media in preparation of radio frequency capacitors for household radio receivers. More particularly, the new compositions of matter comprise ceramically prepared combinations of meta titanates of zinc and magnesium, such compositions exhibiting high stability in preparation and in electrical properties when the temperature is varied.

The most important single component of a radio frequency circuit for radio receivers of the household type is the condenser or capacitor. For the precise tuning of the circuit over the temperature range encountered in household use, the requirements for capacitors in the tuning circuit are rigorous. The capacitor must have a temperature coefficient of capacity over the temperature range 20° C. to 60° C. so that the capacity does not vary more than 2% to 3% of the room temperature value. In addition, the power factor should not exceed a maximum of 0.1% at any time. When the small individual type sets are involved, a further requirement of compactness is involved. Three types of capacitors are generally used; paper, mica, and ceramically formed magnesium meta titanate. The power factor of paper condensers is generally much too high for precise usage, while mica capacitors are expensive. More importantly, however, the dielectric constant of both mica and paper is of the order of 6 to 8 and a relatively bulky assembly is required. Ceramics made of magnesium meta titanate are more suitable than either mica or paper for many reasons. When properly made, this material has a dielectric constant of about 18, power factors less than 0.1% at radio frequencies. The temperature coefficient of capacity is such that the variation over the 20° to 60° C. range is within the limitation for the application. In view of the dielectric constant, relatively compact components can be made.

In spite of its advantages over mica and paper, magnesium titanate capacitors suffer from one serious defect. The compound undergoes chemical reduction with great ease on firing. When this occurs, a portion of the titania is reduced to lower valent forms, the power factor may be equivalent to several percent, and the material acts somewhat as a semiconductor. Unfortunately, this defect cannot be detected until the assembly is completed, after which detection the piece must be scrapped. A precautionary device in firing magnesium titanate bodies is required, giving assurance that the firing atmosphere is strongly oxidizing at all times. Even under these conditions reduction and attendant loss of production occurs.

It is an object of the invention to eliminate the above recited defects of magnesium titanate.

I have found that the ease of reduction defect of magnesium titanate bodies may be eliminated entirely by adding substantial portions of zinc titanate to the magnesium titanate. Not only may such compositions be fired with impunity relative to reduction without special precautions, but certain members of the zinc titanate-magnesium titanate group have dielectric constants of about 30 at radio frequencies. In addition, all members of the series have temperature coefficients of capacity over the temperature range 20° to 60° C. so that the variation of capacity from the room temperature value in this range is substantially less than the plus or minus 2 to 3% limitation requirement. Finally, the power factors at radio frequencies in the temperature range listed is invariably less than 0.1%.

In the practice of my invention I generally use ceramically prepared magnesium meta titanate and zinc titanate as the basic ingredients of my novel group of compositions. A suitable particle size range for such materials is 0.5 to 2.0 microns. The powders are first blended dry in the proportions indicated in the examples. Then water is added in the ratio of 100 parts of dry powder to 10 parts of water. After thorough mixing, the damp powder is forced through a 35 mesh screen and the granules obtained formed by pressing. A suitable pressure is 6000 to 8000 pounds per square inch. The pressed pieces are dried and fired in an oxidizing atmosphere to vitrification, that is, until a condition of substantially zero porosity is developed. Normal firing temperatures for compositions in the group are 2300° F. to 2350° F. After cooling, the pieces are cleaned, silver electrodes are fired on the appropriate surfaces, lead in wires are soldered on, a weatherproof casing is supplied, and the assembly is ready for test.

The following examples are given merely as illustrative of the invention and are not deemed to be limitative thereof.

EXAMPLE I

Zinc titanate and magnesium titanate were mixed in the proportions given in the table. After blending, addition of water and forming by pressure, the pieces were fired to the temperatures indicated, using a schedule of 400° F. per hour, holding 2 hours at peak temperatures and allowing to cool. After silvering and evaluating at radio frequencies, the dielectric values obtained at room temperature are given.

TABLE I

*Room temperature electrical characteristics of $ZnTiO_3$-$MgTiO_3$ series*

|   | $MgTiO_3$ | $ZnTiO_3$ | Firing Temperature | Dielectric Constant at 1 Megacycle | Power Factor in Per Cent at 1 Megacycle |
|---|---|---|---|---|---|
|   |   |   | °F. |   |   |
| A | 95 | 5 | 2,300 | 19.7 | 0.012 |
| B | 90 | 10 | 2,350 | 20.4 | 0.011 |
| C | 80 | 20 | 2,350 | 21.4 | 0.04 |
| D | 60 | 40 | 2,350 | 21.6 | 0.07 |
| E | 40 | 60 | 2,350 | 21.4 | 0.09 |
| F | 20 | 80 | 2,300 | 21.7 | 0.06 |
| G | 10 | 90 | 2,300 | 29.7 | 0.05 |
| H | 5 | 95 | 2,300 | 31.4 | 0.05 |

The temperature coefficient data are given in Table II and Table III.

TABLE II

*Variation of dielectric constant with temperature*

[Data obtained at one megacycle]

| Body, °C. | A | B | C | D | E | F | G | H |
|---|---|---|---|---|---|---|---|---|
| 20 | 19.65 | 20.38 | 21.41 | 21.62 | 21.38 | 21.70 | 29.74 | 31.38 |
| 30 | 19.66 | 20.41 | 21.43 | 21.64 | 21.39 | 21.71 | 29.73 | 31.36 |
| 40 | 19.69 | 20.43 | 21.43 | 21.65 | 21.40 | 21.73 | 29.72 | 31.34 |
| 50 | 19.69 | 20.45 | 21.46 | 21.66 | 21.42 | 21.75 | 29.70 | 31.30 |
| 60 | 19.70 | 20.46 | 21.48 | 21.68 | 21.44 | 21.77 | 29.68 | 31.26 |
| 70 | 19.71 | 20.48 | 21.50 | 21.70 | 21.46 | 21.79 | 29.67 | 31.23 |
| 80 | 19.71 | 20.52 | 21.50 | 21.71 | 21.48 | 21.81 | 29.66 | 31.19 |
| 90 | 19.73 | 20.53 | 21.53 | 21.73 | 21.50 | 21.83 | 29.64 | 31.15 |
| 100 | 19.75 | 20.57 | 21.56 | 21.75 | 21.51 | 21.86 | 29.61 | 31.13 |
| 110 | 19.78 | 20.58 | 21.58 | 21.77 | 21.52 | 21.89 | 29.60 | 31.11 |
| 120 | 19.80 | 20.60 | 21.60 | 21.79 | 21.56 | 21.91 | 29.60 | 31.07 |
| 130 | 19.81 | 20.62 | 21.61 | 21.81 | 21.58 | 21.93 | 29.58 | 31.05 |
| 140 | 19.83 | 20.64 | 21.62 | 21.82 | 21.60 | 21.95 | 29.56 | 31.03 |
| 150 | 19.86 | 20.66 | 21.64 | 21.84 | 21.62 | 21.99 | 29.55 | 31.01 |

TABLE III

*Variation of power factor with temperature*

[Data in per cent at one megacycle]

| Body, °C. | A | B | C | D | E | F | G | H |
|---|---|---|---|---|---|---|---|---|
| 20 | 0.013 | 0.011 | 0.040 | 0.071 | 0.090 | 0.060 | 0.051 | 0.042 |
| 30 | 0.013 | 0.011 | 0.035 | 0.067 | 0.080 | 0.060 | 0.051 | 0.044 |
| 40 | 0.016 | 0.013 | 0.033 | 0.062 | 0.074 | 0.060 | 0.056 | 0.046 |
| 50 | 0.020 | 0.011 | 0.033 | 0.051 | 0.061 | 0.062 | 0.056 | 0.047 |
| 60 | 0.024 | 0.011 | 0.035 | 0.031 | 0.061 | 0.062 | 0.056 | 0.048 |
| 70 | 0.027 | 0.013 | 0.038 | 0.029 | 0.060 | 0.062 | 0.056 | 0.052 |
| 80 | 0.029 | 0.013 | 0.040 | 0.029 | 0.060 | 0.064 | 0.061 | 0.055 |
| 90 | 0.029 | 0.015 | 0.044 | 0.029 | 0.058 | 0.067 | 0.061 | 0.064 |
| 100 | 0.031 | 0.017 | 0.049 | 0.030 | 0.061 | 0.069 | 0.066 | 0.073 |
| 110 | 0.033 | 0.019 | 0.053 | 0.030 | 0.064 | 0.070 | 0.067 | 0.079 |
| 120 | 0.035 | 0.024 | 0.059 | 0.030 | 0.068 | 0.072 | 0.074 | 0.088 |
| 130 | 0.038 | 0.028 | 0.069 | 0.030 | 0.074 | 0.074 | 0.074 | 0.095 |
| 140 | 0.042 | 0.031 | 0.082 | 0.033 | 0.079 | 0.076 | 0.085 | 0.107 |
| 150 | 0.046 | 0.042 | 0.097 | 0.038 | 0.084 | 0.080 | 0.096 | 0.118 |

What is claimed is:

1. A ceramic dielectric consisting of a ceramic mixture of magnesium titanate and zinc titanate.

2. A ceramic dielectric consisting of a ceramic mixture of magnesium titanate and zinc titanate, the former being in the range 95% to 5% and the latter from 5% to 95% by weight.

3. The method of regulating the dielectric properties of magnesium titanate which comprises ceramically admixing zinc titanate therewith.

4. The method of regulating the dielectric properties of magnesium titanate which comprises ceramically admixing zinc titanate therewith in the range 5% to 95% of the final product.

EUGENE WAINER.